Dec. 5, 1939. W. F. GROENE ET AL 2,182,228
METHOD OF MACHINING CRANKSHAFTS
Original Filed May 16, 1936 7 Sheets-Sheet 1
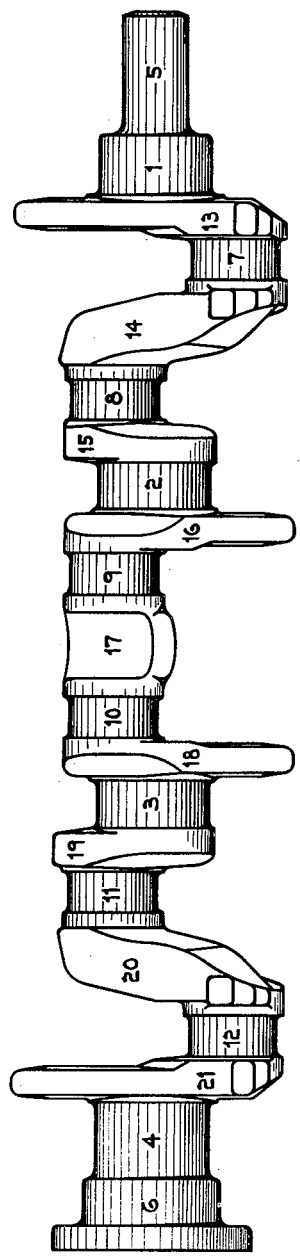
FIG. I
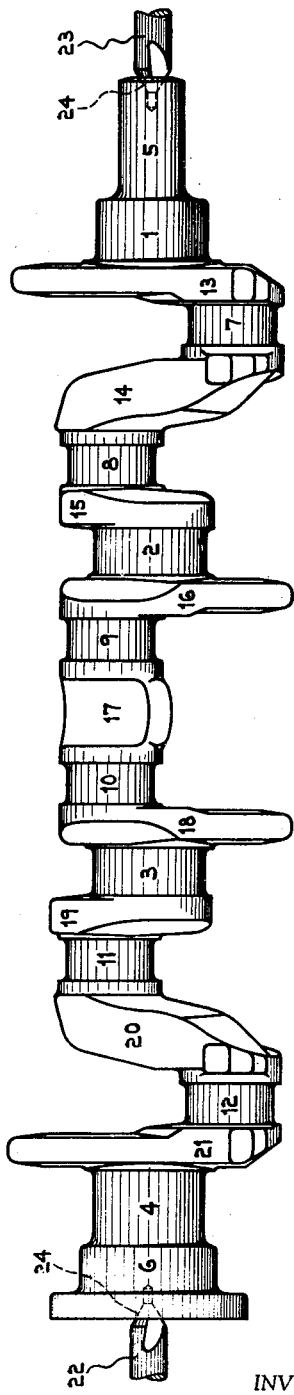
FIG. II
WITNESS.
Orlando S. Knox
BY
INVENTORS.
WILLIAM F. GROENE
WALTER R. MEYER
Willard S. Groene
ATTORNEY.

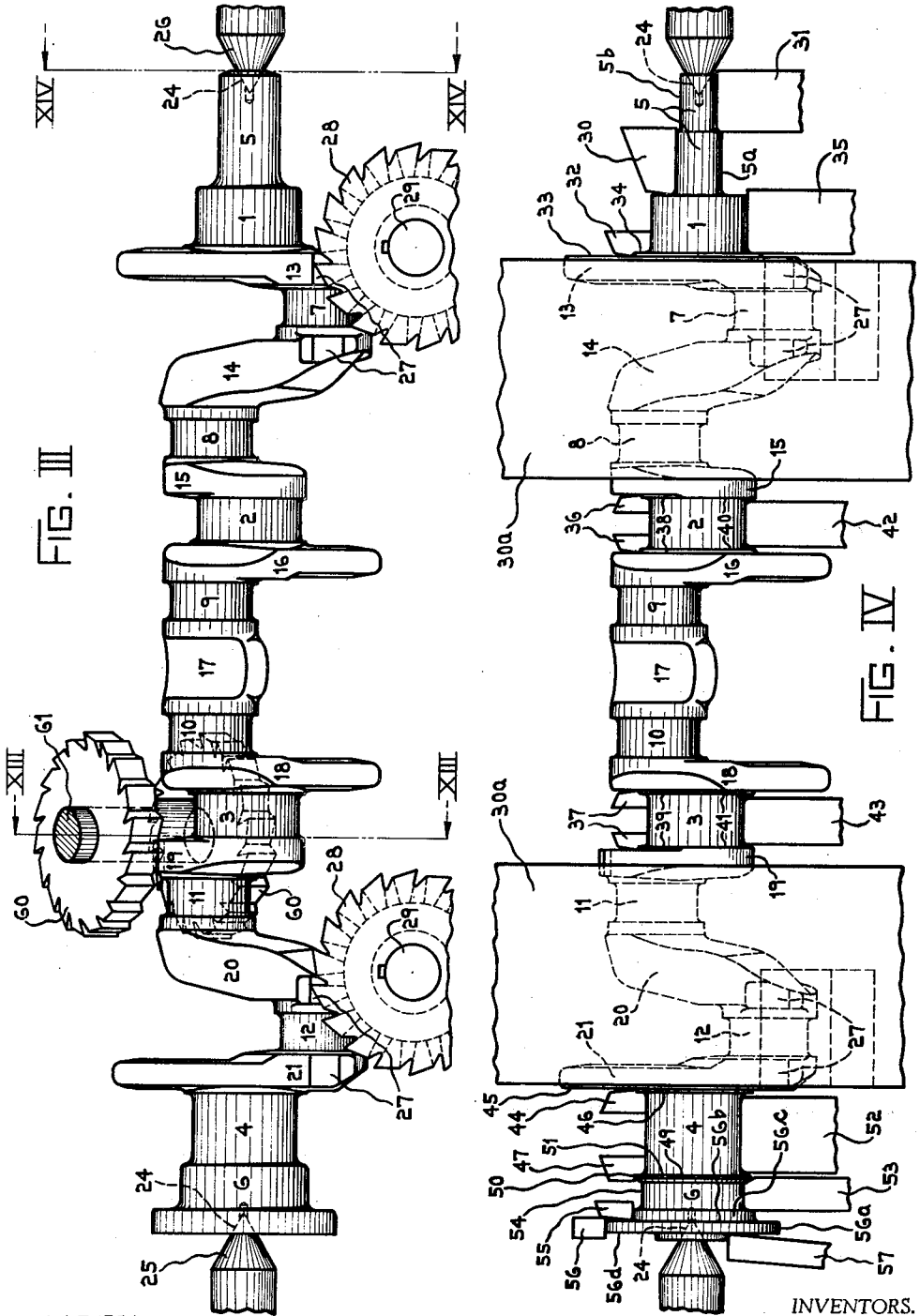

Dec. 5, 1939.   W. F. GROENE ET AL   2,182,228
METHOD OF MACHINING CRANKSHAFTS
Original Filed May 16, 1936   7 Sheets-Sheet 3
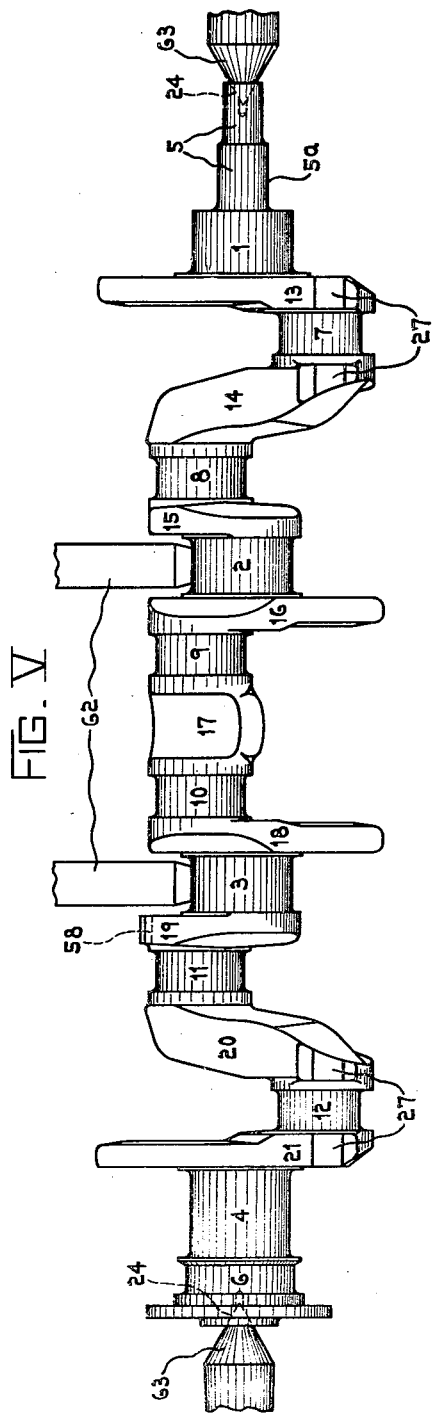
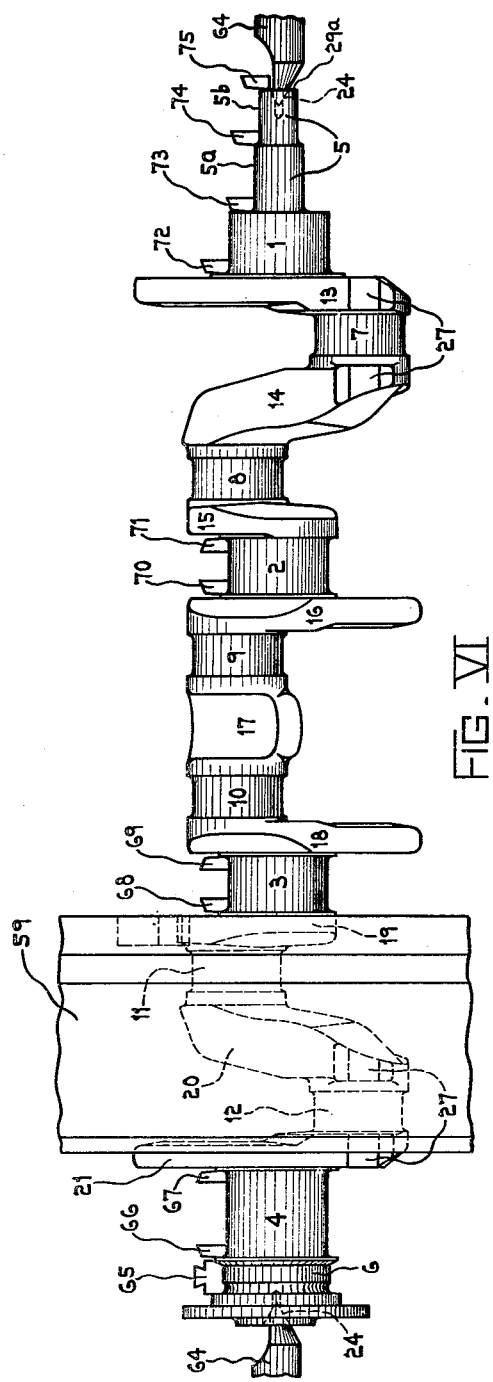
INVENTORS.
WILLIAM F. GROENE
WALTER R. MEYER
ATTORNEY.

Dec. 5, 1939.  W. F. GROENE ET AL  2,182,228
METHOD OF MACHINING CRANKSHAFTS
Original Filed May 16, 1936   7 Sheets-Sheet 4
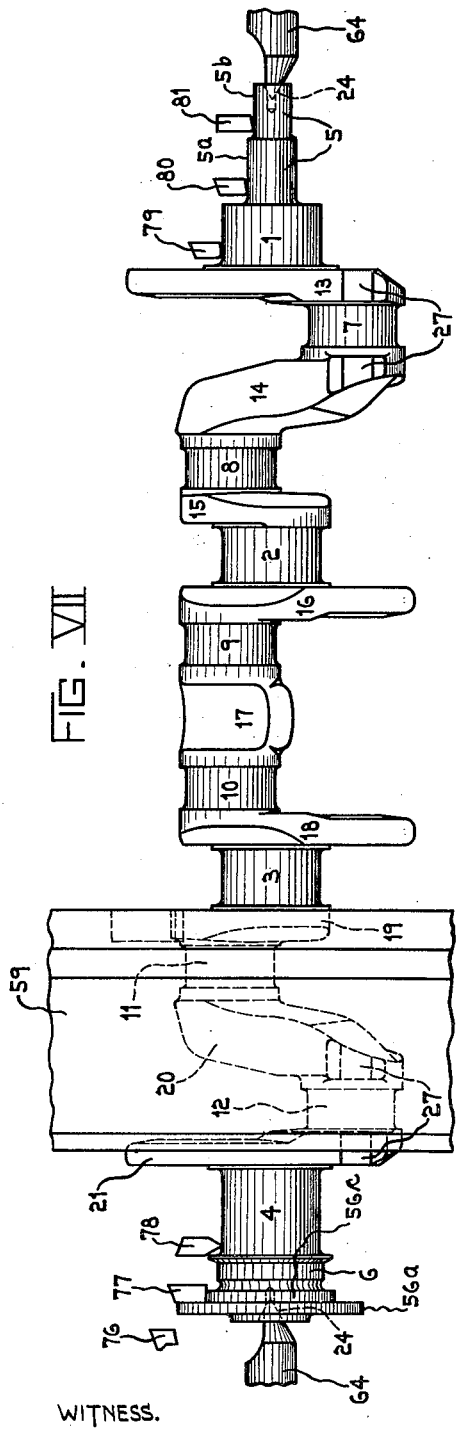
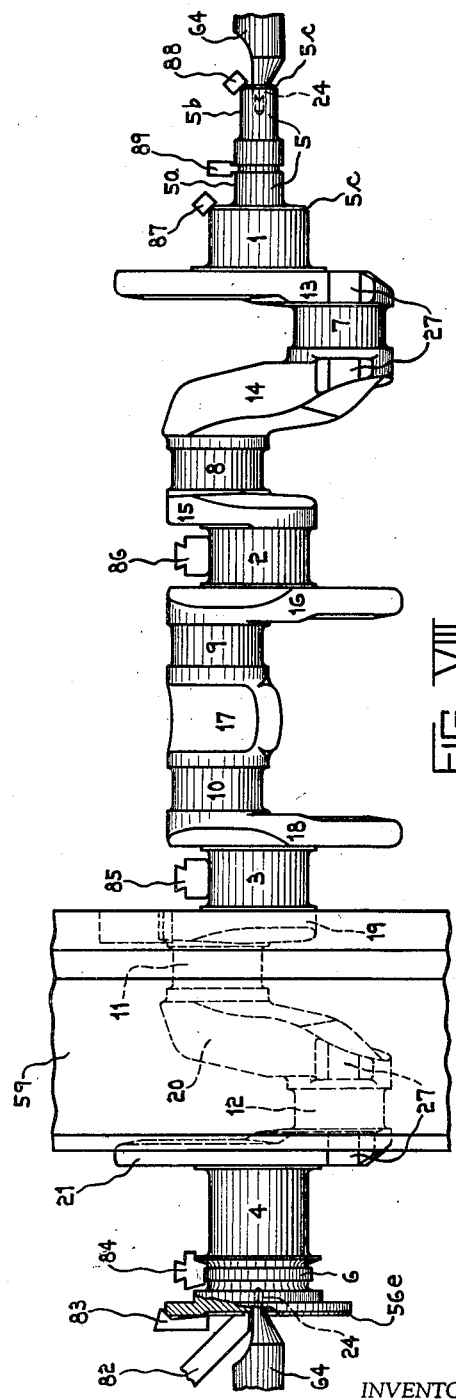
INVENTORS.
WILLIAM F. GROENE
WALTER R. MEYER
ATTORNEY.

Dec. 5, 1939. W. F. GROENE ET AL 2,182,228
METHOD OF MACHINING CRANKSHAFTS
Original Filed May 16, 1936 7 Sheets-Sheet 5
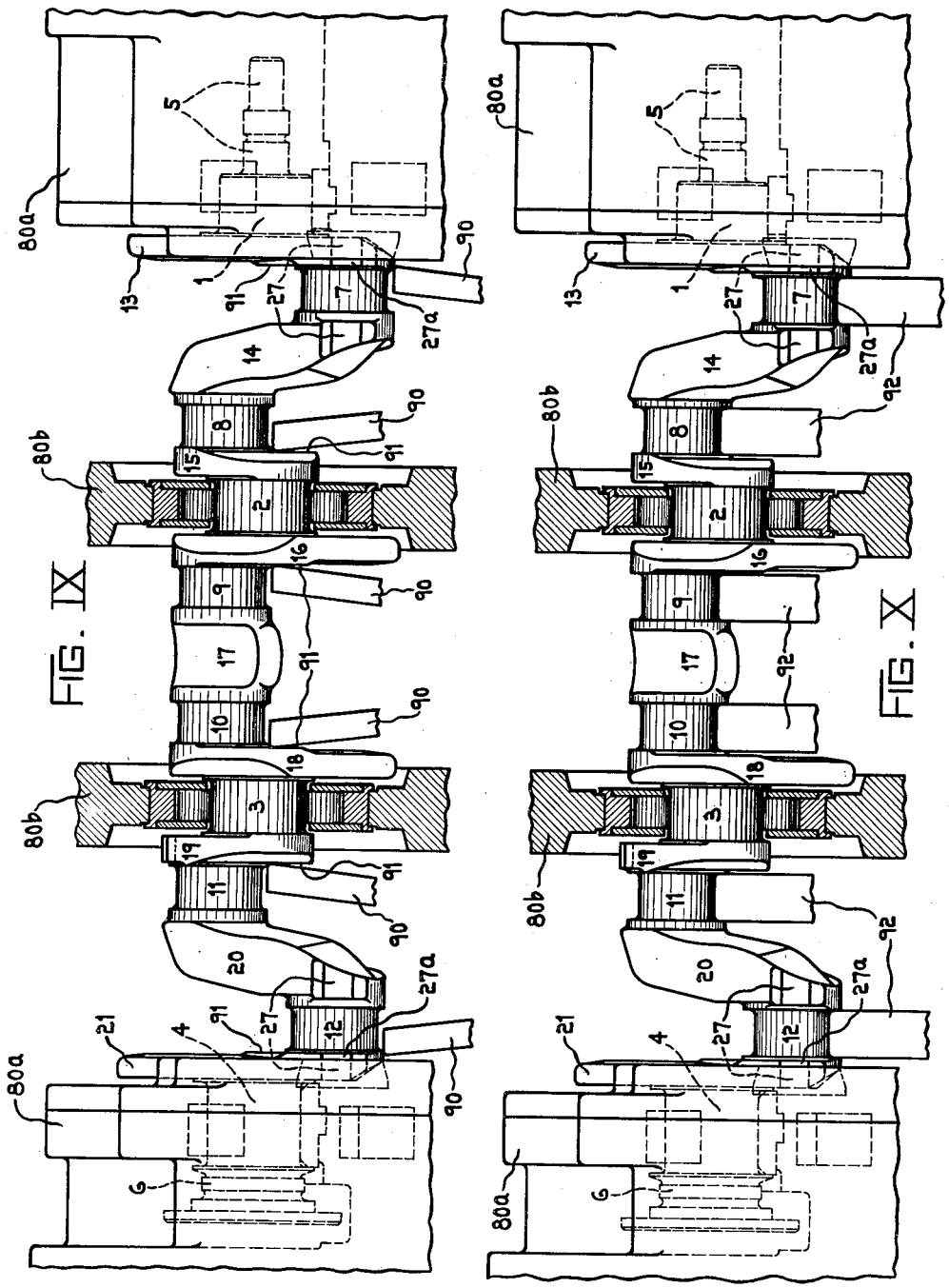
WITNESS.
Orlando S. Knox
BY Willard S. Groene
INVENTORS.
WILLIAM F. GROENE
WALTER R. MEYER
ATTORNEY.

Dec. 5, 1939.  W. F. GROENE ET AL  2,182,228
METHOD OF MACHINING CRANKSHAFTS
Original Filed May 16, 1936  7 Sheets-Sheet 6
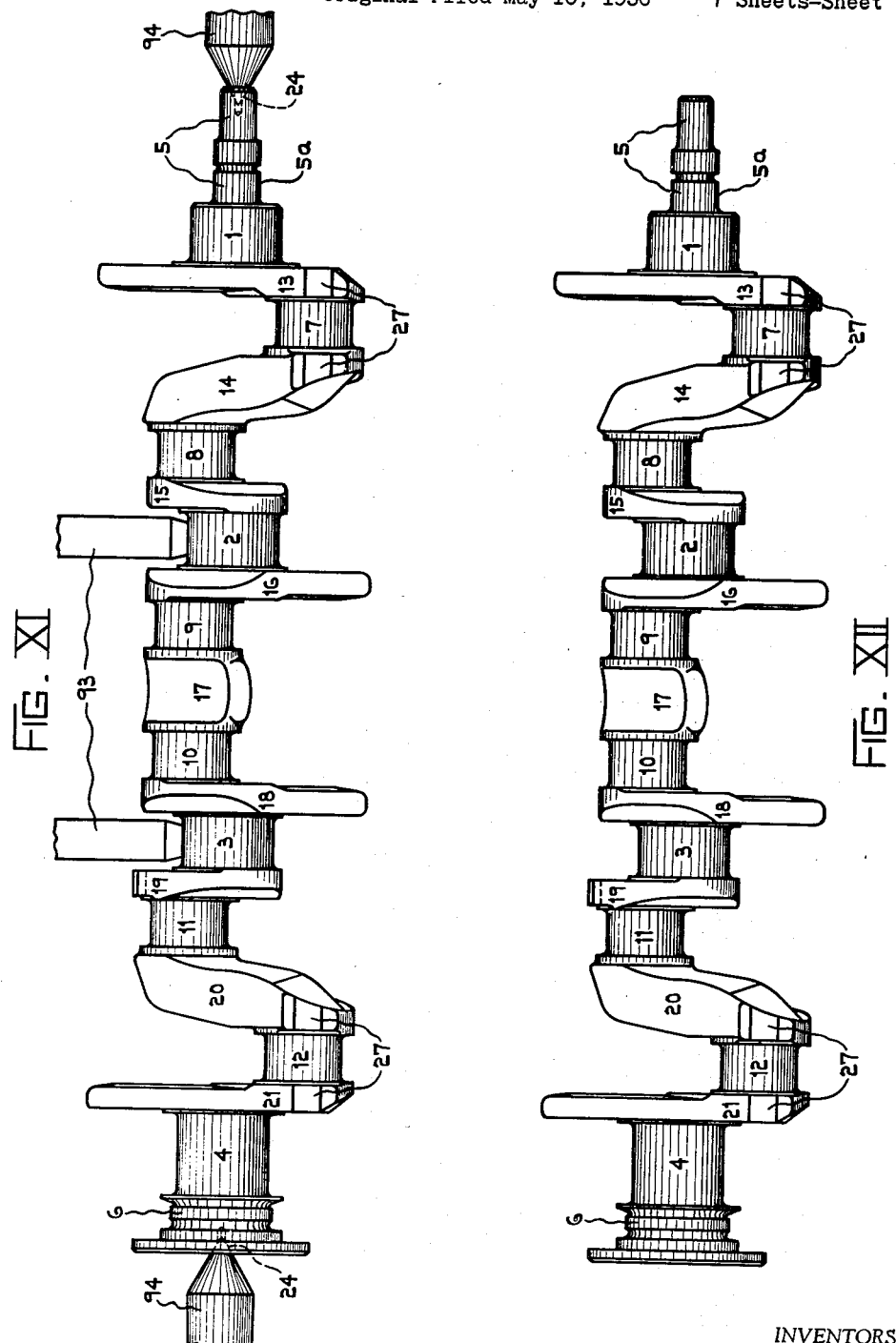
WITNESS.
Orlando S. Knox
INVENTORS.
WILLIAM F. GROENE
WALTER R. MEYER
BY Willard S. Groene
ATTORNEY.

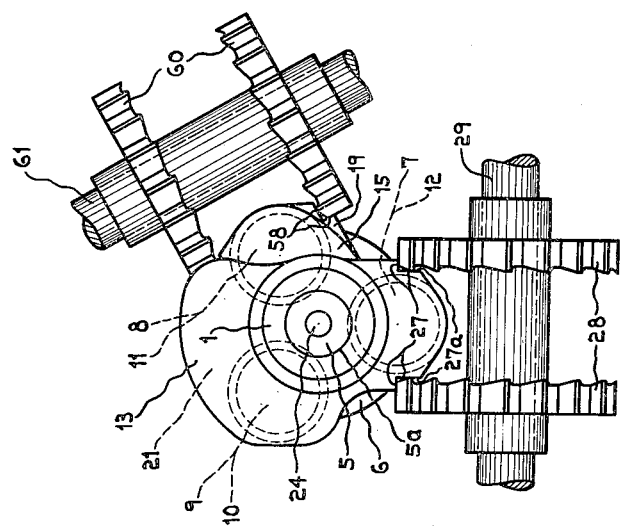

Patented Dec. 5, 1939

2,182,228

UNITED STATES PATENT OFFICE 2,182,228

METHOD OF MACHINING CRANKSHAFTS

William F. Groene and Walter R. Meyer, Cincinnati, Ohio, assignors to The R. K. Le Blond Machine Tool Company, Cincinnati, Ohio, a corporation of Delaware Original application May 16, 1936, Serial No. 80,204. Divided and this application September 23, 1938, Serial No. 231,408

7 Claims. (Cl. 82—1)

This invention pertains to the machining of crankshafts for multi-cylinder internal combustion engines and more particularly to the machining of the various line bearing, pin bearing, and associated portions of such crankshafts. This application is a division of our application Serial No. 80,204 filed May 16, 1936.

The machining of the line bearing and pin bearing portions of multi-throw crankshafts has always been a most difficult problem, especially when high production must be undertaken to produce such shafts in large quantities as, for example, is required for the automotive industry. The very shape and nature of the material of a crankshaft of this type leads to a multitude of difficulties when rapid machining operations are to be undertaken on the various bearing portions of the shaft.

There are three major aspects to this problem which involve inherent difficulties with the crankshaft itself. The first problem is that the shape of the crankshaft is such that the distribution of the metal is so displaced at various radially extended positions from a true cylindrical form of similar length that any machining undertaken on it results in torque stresses being set up in the crankshaft. This is particularly true in modern day machining operations on crankshafts wherein a large amount of metal is very rapidly removed from a plurality of bearing portions of the crankshafts at one time. This causes certain portions of the shaft to be rotated relative to other portions of the shaft so as to cause a displacement of the various portions relative to one another and to the true axis of rotation of the shaft.

A second inherent characteristic of a crankshaft which leads to extreme difficulty during machining is that when the metal is removed from the various bearing and associated portions of the crankshaft, stresses are relieved in said shaft which were originally set up during the forging or casting operation, so that when the work is again removed from the machine performing the turning operation, it is found that these shafts spring to a new position thus throwing the machined portions out of properly aligned position and resulting in inaccuracy of these machined portions.

And a third inherent characteristic of the crankshaft is the fact that it is extremely limber due to its shape. This is particularly so when it is supported at each of its ends. A force of even minor magnitude which is imparted to it by the cutting tools somewhere intermediate its ends easily deflects the shaft from true axial position, causing the machined portions to be formed on the shaft while it is in a deflected or sprung condition. Thus, at the completion of the machining operation, when the crankshaft springs back, the machined portions are found to be displaced from their correct positions.

The three chief difficulties to be met in turning a crankshaft are therefore (1) twisting caused by rotating the shaft against the cutting tools, (2) springing of the shaft to a new position caused by the removal of metal, and (3) deflection of the shaft during machining, usually arising from forces produced by the cutting tools during the cutting operation. With these things clearly in mind and at all times keeping to the fore the necessary requirements of heavy cuts and rapid production in the machining of the various bearing portions of these crankshafts, we have devised a method or methods whereby the production of these parts is done with a maximum of efficiency and output and also with a great improvement in the quality and accuracy of the finished product.

Because of the three above mentioned difficulties of crankshaft machining, at one time the accepted theory of procedure in machining the bearing portions of a crankshaft was to machine each bearing in a separate operation or to machine small groups of the bearings simultaneously. This splitting up of the machining operations was at that time considered necessary in any practical machining procedure. And it had also been found necessary to have frequent intermittent corrective straightening and grinding operations between these various machining steps. All of these former methods were based on the theory that the crankshaft obviously could not stand simultaneous machining operations nor could a crankshaft of the required accuracy be produced under such conditions.

The chief objects of the present invention are the provision of a fully correlated procedure for preparing crankshafts, and the provision of a method of machining crankshafts in which intermediate corrective straightening and grinding operations are eliminated, but which at the same time produces a work piece of greater accuracy and finish than ever heretofore attained. Incorporated in this unique process is also a procedure to eliminate all detailed machining operations on the line bearings of the crankshaft.

Further objects and advantages of this invention will appear in the following detailed description. In the drawings:

Figure I is an illustration of a rough unmachined forging (or casting) of a six-throw four-line bearing crankshaft.

Figure II shows the drilling of center holes in the ends of the rough forging of Figure I.

Figure III shows the rough forging having locating areas machined on its webs while it is held on centers.

Figure IV shows the crankshaft chucked in a double center drive lathe by means of some of the locating areas machine in Figure III and supported at its ends on center, with cutting tools applied to simultaneously rough turn all the line bearings, flange, and stub end portions of the crankshaft.

Figure V shows a straightening operation on the crankshaft after the rough machining operation of Figure IV.

Figure VI shows the first stage of the finish turning of all of the line bearings, flange, and stub ends of the crankshaft.

Figure VII shows the second stage of the finish turning of all of the line bearings, flange, and stub ends of the crankshaft.

Figure VIII shows the last stage of the finish turning of all of the line bearings, flange and stub ends of the crankshaft.

Figure IX shows the crankshaft supported by means of its finish turned line bearings, with cutting tools applied to face the cheeks of the webs adjacent the crank pins of the crankshaft.

Figure X shows the crankshaft supported as in Figure IX but with tools applied to turn the crank pins of said crankshaft.

Figure XI shows a straightening operation after all turning operations have been completed on the bearing portions of the crankshaft.

Figure XII is the finish turned crankshaft ready for the finish grinding operations.

Figure XIII is a partial cross section through the crankshaft on the line XIII—XIII of Figure III.

Figure XIV is a view substantially on the line XIV—XIV of Figure III.

In the practice of our invention we provide a method of machining crankshafts whereby the distortion resulting from each machining operation is automatically compensated for in each subsequent operation until the crankshaft is finally completely machined so that all of the various steps of the machining operation are completed in a definite relationship to all other machining operations necessary to complete the shaft.

We also provide means for taking care of the distortion resulting in the crankshaft from the removal of metal during the various stages of the machining operation so that the completed crankshaft will have a minimum of inherent strain or distortion therein.

Again, in the practice of our invention we provide a method comprising roughing out the line bearings of a crankshaft, allowing the crankshaft to spring to a new position, and then finish machining the line bearing portions while the crank is in such condition that the completed finish turned bearing portions will be in exact alignment with one another and be correctly dimensioned while the crankshaft is in said new position.

Further in the practice of our invention we provide a method for machining the line bearing portions of a crankshaft comprising pre-machining locating areas on the rough webs of the unmachined crankshaft, chucking said crankshaft by means of said locating areas and roughing out the line bearing and associated portions of said crankshaft, then unchucking said crankshaft and allowing it to spring to a new position caused by the removal of the metal during the initial rough machining operation, then rechucking said crankshaft in another lathe by engaging rough surfaces of the webs or pins thereof so that said crankshaft is chucked in its new position, then applying finish turning tools to said line bearing portions to remove a relatively small amount of metal to complete the turning operations on said line bearings so that said line bearings are completed in properly aligned position while the shaft is maintained in said new position.

Another procedure in the practice of our invention is a method comprising pre-machining locating notches on the rough webs of a crankshaft, chucking said crankshaft by means of said locating notches, and rough machining the line bearing portions thereof, and then unchucking said crankshaft and rechucking said crankshaft in another lathe by means of the same locating notches so as to bring said crankshaft back to the position it was held in during the rough machining operation, and finish turning said line bearing portions. This is followed by rechucking said crankshaft in another machine by means of said finish turned line bearing portions to maintain said crankshaft in the same position it was held in during said two prior operations and completing the pin bearing portions of said crankshaft, and then finally providing a straightening operation on said crankshaft so as to eliminate any remaining strains and distortion in said crankshaft. In other words, this aspect of our invention is a process of machining the crankshaft wherein at each machining stage the crankshaft is automatically forced and held in a definite predetermined position. Intermediate straightening operations or other corrective operations on the shaft are not employed until the final machining is done. All of the stresses, many of which neutralize the previous stresses set up by former machining operations, are thus allowed to remain in the shaft so as to minimize the number of rebending operations during the process, and so as to produce a crankshaft with a minimum of distortion at the completion of all of the turning operations.

Another aspect of our invention involves a process for machining the line bearing portions of a crankshaft comprising the steps of pre-machining locating areas on the webs of the unmachined crankshaft, chucking said crankshaft by means of said locating areas and roughing out all of the line bearing and associated portions of said crankshaft, then unchucking said crankshaft and allowing it to spring to a new position caused by the removal of the metal in the roughing operation, then remachining the locating areas or machining additional locating areas on the webs of said crankshaft while the crankshaft is on centers in the original center holes but while it is in the possibly sprung position it assumed after the rough turning operation, then rechucking said crankshaft by means of said second mentioned locating areas in another lathe, and finish machining the line bearing portions of said crankshaft so that at the completion of said operation said crankshaft will be in said new position with its various line bearing portions nevertheless in exact alignment and in accurate dimension.

We also provide a method for machining the line bearing portions of a crankshaft comprising premachining centers and locating areas on the rough crankshaft, then chucking said crankshaft in a lathe by means of said locating areas (utilizing centers in said center holes), then rough machining all of the line bearing portions of said crankshaft, then supporting said crankshaft by its center holes in its new sprung position resulting from the removal of metal during the roughing operation on the line bearings and machining new locating areas on the crankshaft when in said condition, then chucking said crankshaft in another lathe by means of said second mentioned locating areas as before, and remachining said line bearing portions in a plurality of steps each of which removes only a very minimum of metal and produces very little strain upon the crankshaft in applying the cutting tools thereto, whereby to produce highly accurate and highly finished line bearings in proper alignment with one another, which bearing portions remain so aligned when the crankshaft is removed from said machine since these finishing operations were undertaken while the shaft was in said new position.

We shall now describe these operations in detail. Referring to Figure I the crankshaft comprises the line bearings 1, 2, 3, and 4, and the associated stub end 5 and flange end 6; the pin bearings 7, 8, 9, 10, 11, and 12; and the connecting webs 13, 14, 15, 16, 17, 18, 19, 20, and 21.

The first operation, Figure II, on the rough unmachined crankshaft is to apply the center drills 22 and 23 to the ends of the shaft to machine the center holes 24 which establish the main axis of rotation for said shaft. This is usually and preferably done after first establishing an axis by dynamically balancing the casting or forging.

The next step, Figure III, comprises supporting the crankshaft on center pins 25 and 26 entered in the center holes 24, and milling the locating notches 27 on webs 13, 14, 20, and 21 of the crankshaft by means of suitable milling cutters 28 carried on arbors 29 in a manner substantially as shown in Patent 2,118,260 dated May 24, 1938. These locating notches 27 are thus machined in a definite predetermined position relative to the center holes 24 at this time.

Having thus prepared the crankshaft, it is then chucked in a center drive lathe for the operation shown in Figure IV, the lathe preferably being of a character shown in Patent 2,069,107 having chucks 30a preferably of a type shown in Patents 2,030,020 dated February 4, 1936, and 2,106,501 dated January 25, 1938. In this lathe the line bearings, flange and stub ends of the crankshaft are rough turned. The cutting tools 30 and 31 turn the stub end diameter 5; the cutting tool 32 machines the face 33 and the fillet 34 of the web 13 while the cutting tool 35 operates on the line bearing 1. Cutting tools 36 and 37 machine the faces 38 and 39 and the fillets 40 and 41 of the webs 15 and 16, and 18 and 19 associated with the intermediate line bearings 2 and 3 while the cutting tools 42 and 43 operated on said bearings. The cutting tool 44 machines the face 45 and the fillet 46 of the web 21. The cutting tool 47 faces the side 49 and turns the diameter 50 of the oil slinger 51 while the cutting tool 52 machines the line bearing 4. The cutting tool 53 machines the oil groove 54 while the tools 55, 56, and 57 machines the various flange portions. This operation is a roughing operation in which very large amounts of metal are removed from the crankshaft very rapidly and in which finish need not be particularly considered. All of the various minute surfaces of these line bearing portions are not machined to accurate dimension because it is found impractical to do so because of the inability of the cutting tools to accurately maintain their cutting edges during such an operation. Large amounts of power are likewise used during this operation. It is found that due to the large cutting forces exerted on the work, the localized heating resulting from the rapid removal of metal, and the redistribution of internal strains, which neutralize each other in the normal condition of the crankshaft before large amounts of metal are removed, cause the shaft to spring to a new position when unchucked and removed from the lathe, thus throwing the machined portions out of proper alignment. It has been found, strangely enough, that if this same amount of metal were removed at a much slower rate that the crankshaft when unchucked from the lathe still springs to a distorted position due to the relieving of strains in removing metal from the crankshaft. Therefore it is found more practical from a production and accuracy point of view to perform this operation very rapidly and to correct these irregularities in a series of unique subsequent steps to be described. Not only do these subsequent operations greatly improve the accuracy and speed of producing the crankshafts, but they also greatly reduce the number of operations necessary to complete the crankshaft with a resultant great saving in the cost of the product.

Typical operations heretofore required to complete the bearing portions on a crankshaft of this type after the line bearings have been roughed out are as follows:

(a) Straighten (Figure V).
(b) Rough grind line bearings 2 and 3 and width between the fillets 40 and 41.
(c) Rough grind line bearing 1 and fillet 34.
(d) Rough grind gear fit 5a.
(e) Rough grind fillets 46 and 49.
(f) Rough grind line bearing 4.
(g) Finish form oil slinger 51, groove 54, and flange diameter 56a (Figures IV, VI, VII, and VIII).
(h) Finish face back of flange 56b and turn bolt circle 56c. Finish face flywheel face 56d of flange, chamfer 56e of flange and turn diameter 50 of oil slinger (Figures IV, VI, VII, and VIII).
(i) Cheek webs adjacent crank pins (Figure IX).
(j) Turn crank pins (Figure X).
(k) Straighten.
(l) Finish grind crank pins.
(m) Straighten.
(n) Re-center both ends.
(o) Finish grind line bearings 2 and 3 and width between the fillets 40 and 41.
(p) Finish grind line bearing 1 and fillet 34.
(q) Finish grind fillets 46 and 49.
(r) Finish grind line bearing 4.
(s) Finish grind diameter 50 of oil slinger.
(t) Finish grind pulley diameter 5b.
(u) Finish grind diameter 56a of flange.
(v) Grind face 56d of flange.

In applicants' method or methods the sequence of operations would be substantially as follows:
(a) Straighten (Figure V) only when it is desired to use same locating notches for finish turning as used in rough turning.
(b) Mill locating notches 58 in web 19 for finish turning simultaneously all line bearing, flange and stub end portions. Operation (a) not required when this is done.

(c) Finish turn all line bearing, flange and stub end portions preferably in a lathe of a character shown in Patent 2,138,522, dated Nov. 29, 1938 (Figures VI, VII, VIII). Operations (a) and (b) not required when chucks of a character shown in Patents 2,110,266 dated March 8, 1938, and 2,113,509 dated April 5, 1938, are used in the center drive mechanism 59 of this lathe.

(d) Cheek webs adjacent crank pins (Figure IX).

(e) Turn crank pins (Figure X).

(f) Straighten.

(g) Finish grind crank pins.

(h) Finish grind line bearings 1, 2, 3, and 4.

(i) Finish grind pulley diameter 5b.

(j) Finish grind diameter 56a of flange.

(k) Grind face 56d of flange.

A study of the above tabulations clearly indicates that the number of operations formerly required has been substantially cut in half. It is also to be noted that all of the time consuming and costly rough grinding operations and all finish grinding on the fillets associated with the line bearings has been eliminated. And it is also obvious that numerous straightening operations and a number of individual lathe operations have been completely eliminated.

Method No. 1

One way of carrying out the applicants' method is (Figure III) to simultaneously machine the locating notches 58 on the web 19 with the milling cutters 60 on an appropriate arbor 61 with the machining of the locating notches 27 and then after the rough turning operation of Figure IV to straighten the crankshaft as in Figure V by applying plungers 62 of a straightening press to the shaft while supported on the centers 63 so as to bring the locating notches 27 or 58 into proper relationship again with the axis of rotation of the crankshaft. The crankshaft is then placed in a multiple spindle drum type lathe of a character shown in Patent 2,138,522 (Figures VI, VII, and VIII) and gripped by means of these locating areas, preferably by the locating areas 58, in a suitable center drive chucking mechanism having a chuck of a character shown in Patent 2,030,020 and supported on centers 64. In this lathe progressive machining operations are undertaken on all of the line bearing portions of the crankshaft.

At Station one (Figure VI) we provide a series of forming tools adapted to be fed at right angles to the axis of rotation of the crankshaft. A form tool 65 takes a finishing cut on a portion of the oil groove 54 and oil slinger 51. A series of tools 66 and 67, 68 and 69, 70 and 71, and 72 finish the faces of the fillets and narrow portions of the diameters of the line bearings 1, 2, 3, and 4 to proper size for finish grinding. Tools 73 and 74 face the shoulders of the respective stub end portions 5a and 5b and neck these shoulders for the finish grinding operations. The tool 75 finish faces the end 29a of the shaft to proper length.

At Station two (Figure VII) the turning tools are fed longitudinally of the axis of the work. Tool 76 finish turns the diameter 56a of the flange. Tool 77 turns and necks the bolt circle 56c to proper finish turned size. Tool 78 finish turns that portion of the line bearing 4 which is between the narrow finished diameter produced by the tools 66 and 67 at Station one. Tool 79 finish turns the line bearing 1 from the portions 5a matching the cut with the narrow turned diameter produced by the tool 72 of Station one. It is to be clearly noted that the turning tools 78 and 79 produce a surface with a finish and accuracy equivalent to rough grinding and with a uniformity for each piece sufficiently precise to permit chucking the work piece in chucking devices 80a and utilizing a process as set forth in Patents 1,878,130, Re. 19,730, and 2,030,142 dated February 11, 1936, without requiring any additional machining or straightening operations on these surfaces. The tools 80 and 81 finish turn the stub end portions 5a and 5b for finish grinding operations.

At work Station three (Figure VIII) forming tools operate on the crankshaft, feeding at right angles to the axis of the web. The tools 82 and 83 are actuated in a manner as shown in Patent 2,097,096 dated October 26, 1937, to finish turn the outside face and chamfer the flange. The form tool 84 completes the necessary work on the flange end oil groove 6 and oil slinger 51. Form tools 85 and 86 produce the required finished surface on the line bearings 2 and 3 which lies between the respective narrow diameters finished by the tools 68 and 69, and 70 and 71 at Station one. These bearings 2 and 3 are finished to an accuracy commensurate with that produced on the bearings 1 and 4 just described so that steady rests 80b of a character shown in Patents 1,906,577 and 2,085,357 may be used in conjunction with the chucking devices and method outlined in the patents already cited above. Tools 87 and 88 finish chamfer the stub end shoulders 5c while the tool 89 forms an oil groove in the stub end diameter 5a.

After the above operations have been completed the crankshaft is then ready to be placed directly into an orbital lathe for machining the crank pins and associated webs without requiring any rough grinding of the line bearings or any straightening as formerly necessary. The crank pins and associated webs may be simultaneously machined in a lathe of a character shown in Re. Patent 18,662. Preferably the crankshaft is placed in an orbital lathe of a character shown in Patent 1,934,530, Figure IX, having chucking devices 80a of a character shown in Patent 2,030,142 arranged to engage the finish turned line bearings 1 and 4 and the faces 27a of the notches for indexing and driving the crankshaft. Steady rests 80b of a character shown in Patent 2,085,357 engage and hold the finish turned line bearings 2 and 3 in exact alignment with the end line bearings 1 and 4. Cheeking tools 90 are arranged to machine the faces 91 of the webs 13, 15, 16, 18, 19 and 21 associated with the crank pins 7, 8, 9, 10, 11 and 12, the crankshaft being at all times held in proper alignment by the chucks 80a and the steady rests 80b engaging the finish turned line bearings 1, 2, 3, and 4.

The crankshaft is then placed in a similar orbital lathe, Figure X, or in another spindle of the same lathe having similar chucks 80a and steady rests 80b which again engage the finish turned line bearings to hold it in exact alignment with the work spindle (thus eliminating any distortion in the shaft resulting from the machining of the webs in Figure IX) during the machining of the crank pins 7, 8, 9, 10, 11 and 12 by the cutting tools 92, thus eliminating any straightening or other corrective operations between the operation of Figure IX and the operation of Figure X.

Any distortion remaining in the crankshaft after the completion of the operation of Figure X may be corrected by straightening the shaft by applying plunger 93 of a straightening press to the shaft while supported on the centers 94. The crankshaft is then in condition for the final finish grinding of the line bearing and pin bearing diameters as shown in Figure XII.

Method No. 2

Another way of carrying out our invention completely eliminates the straightening operation of Figure V. The center holes 24 and the locating notches 27 and 58 are prepared as stated above in Method No. 1. The line bearings, flange and stub ends of the crankshaft are then rough machined as in Figure IV, using the locating notches (preferably the notches 27) to chuck and rotate the shaft. The crankshaft is then chucked in a line bearing finishing lathe as in Figures VI, VII, and VIII by means of the said notches (preferably the notches 58) to finish turn said line bearings, flange and stub end portions. Obviously the crankshaft at the completion of the operation of Figure IV may be sprung to a new position and is likely to have considerable runout, that is, the line bearings do not lie in true axial position when unchucked and ready to be placed in the finishing lathe. However, when again chucked by said notches (58 in this case) in the finishing lathe the line bearings are forced back into correct axial position for the finish turning operations of Figures VI, VII, and VIII.

It will be further apparent that when the crankshaft is again unchucked from this line bearing finishing lathe the shaft may again spring to a new position throwing the line bearing portions out of alignment, although in many instances the various released tensions tend to neutralize each other. The shaft, however, is forced and maintained with its line bearings in proper axial alignment during the orbital turning operations of Figures IX and X by engagement of the chucks 80a and steady rests 80b with the finish turned line bearings 1, 2, 3, and 4.

It can thus be clearly seen that all intermediate straightening and rough grinding operations have been eliminated with this Method No. 2 of completely turning all of the bearing and associated portions of a crankshaft. Another novel feature of this method is that during each machining operation the crankshaft is so held (irrespective of whether it has inherent distortion due to preceding operations) as to cause all of the various bearing portions to be machined in accurate relationship to one another until said operations have all been completed. A final straightening operation, Figure XI, is usually undertaken at the completion of the above machining procedure.

Strangely enough, it has been found much less difficult to straighten the crankshaft when all turning operations have been completed without previous straightening or rough grinding operations than in methods formerly employed which did require intermediate straightening and grinding operations. It has been found that this is due to the elimination rather than the use of a multitude of operations undertaken on the shaft to effect correction of the shaft after each machining operation.

It has also been found that by using the applicants' methods distortion resulting from subsequent machining operations tends in considerable measure to neutralize distortion resulting from previous operations, with the result that the summation of these distortive forces at the completion of all of the turning results in a much more accurate shaft requiring little or no final straightening and a very minimum of finish grinding. This procedure, of course, is quite contrary to the more conventional methods which have emphasized the necessity of completing each machining operation and eliminating its distortion before proceeding to the next operation.

Applicants have been able to completely ignore the intermediate corrective steps formerly believed essential with each of the various machining steps by providing a unique system for properly supporting and machining the crankshaft during each machining step regardless of any inherent distortion existing in said shaft, and to thereby completely machine all of its line bearing and associated portions with a minimum of distortion resulting in the finished shaft.

Our conception of the methods of procedure in meeting the problems of crankshaft turning differ completely from all former procedures in that the work supporting and turning operations necessary to complete the bearing portions of the crankshaft are in themselves utilized to overcome distortion in the work whereas in former methods supplemental straightening and rough grinding operations were always considered necessary to take care of this distortion problem.

Method No. 3

Another way to carry out our method is to machine the locating notches 27, Figure III, and rough turn the line bearing portions as in Figure IV using the notches 27, and then to machine the locating notches 58 after the operation of Figure IV while in the new sprung position preparatory to placing the crankshaft in the line bearing finishing lathe of Figures VI, VII, and VIII. The crankshaft obviously will not be sprung when chucked in the finishing lathe but will have its line bearings out of alignment and will runout. However, sufficient stock is left on the line bearing portions in the operation of Figure IV to be machined away by the finishing lathe to restore proper alignment of said line bearings. This is advantageous because of the high efficiency of this finishing lathe in removing metal and producing highly accurate finished surfaces.

Method No. 4

Still another way to carry out the applicants' method is to machine the locating areas 27 on the crankshaft as in Figure III and then rough turn the line bearing portions as in Figure IV. The crankshaft is then placed in the finishing lathe of Figures VI, VII, and VIII and chucked by means of its rough webs with a chuck for example of a character shown in Patent 2,113,509, the runout of the line bearings being corrected during this finish turning as described above. This may be done because the character of the finish turning is such that there is less force tending to displace the crankshaft in its chucks than is encountered in rough turning.

Method No. 5

And still another way to carry out our method is to provide center holes 24 in the ends of the crankshaft as in Figure II and then chuck said shaft in a line bearing roughing lathe as in Figure IV using chucking devices of a character shown in Patent 2,113,509 and rough out the line bearings and associated portions of the crankshaft. The crankshaft is then placed in the line bearing finishing lathe of Figures VI, VII, and VIII and chucked therein as above by use of a chuck of a character shown in Patent 2,113,509. With this procedure no machined locating notches, rough grinding, or straightening is required.

Having thus fully set forth and described our invention, what we claim as new and desire to secure by United States Letters Patent is:

1. In a method of machining a flexible and deflectible crankshaft, the step (a) of machining locating and holding areas which, when engaged by chucks, will bring and hold the shaft into aligned condition; the step (b) of locking said shaft in aligned condition; and the step (c) of simultaneously turning areas of the shaft while holding it in predetermined alignment.

2. In a method of machining a flexible and deflectible crankshaft, the step (a) of machining locating and holding areas which, when engaged by chucks, will bring and hold the shaft into aligned condition; the step (b) of locking said shaft in aligned condition; the step (c) of simultaneously turning areas of the shaft while holding it in predetermined alignment; and the step (d) of bending said shaft to take a set in the aligned condition with the continued holding in said condition.

3. In a method of machining a flexible and deflectible shaft, the step (a) of machining limited areas at angles to one another; and the step (b) of holding such a shaft by such areas only while otherwise machining the shaft thereby maintaining the machined areas in the same relative position irrespective of distortion.

4. In a method of machining crankshafts whereby the distortion resulting from each machining operation is automatically compensated for in each successive operation until the crankshaft is finally completely machined so that all the various steps of the machining operation are completed in a definite relationship to all other machining operations necessary to complete the shaft comprising the steps of (a) machining limited holding areas on the crankshaft webs; the step (b) of roughing out the line bearings while holding the shaft on said areas; the step (c) of releasing the shaft and allowing it to spring to a new position; and the step (d) of finish machining the line bearing portions of the shaft while it is in such condition that the completed finish turned bearing portions will be in exact alignment with one another and correctly dimensioned while the crankshaft is in said new position.

5. In a method of machining a flexible and deflectible crankshaft, the step (a) of premachining locating areas on the webs of the unmachined crankshaft while holding the ends of the crankshaft centered; the step (b) of chucking locating areas and roughing out the bearings; the step (c) of unchucking said crankshaft and allowing it to spring to a new position caused by the removal of the metal in the roughing operation; the step (d) of remachining the locating areas or machining additional locating areas on the webs of said crankshaft while holding the ends of the crankshaft in a centered position; the step (e) of rechucking the crankshaft by means of the new locating areas; and the step (f) of finish machining the bearings of the crankshaft.

6. In a method of machining a flexible and deflectible crankshaft, the step (a) of dynamically balancing the forged crankshaft and drilling center holes in the ends thereof to establish the main axis of rotation for said shaft; the step (b) of machining limited locating areas on the webs of the crankshaft without upsetting the balance thereof; the step (c) of chucking said shaft by said areas and rough machining it; the step (d) of unclamping the shaft and remachining a second set of areas; and the step (e) of reclamping the shaft on the new areas and finish turning the bearings of the shaft.

7. In a method of machining a flexible and deflectible crankshaft, the step (a) of dynamically balancing the forged crankshaft and drilling center holes in the ends thereof to establish the main axis of rotation for said shaft; the step (b) of machining limited locating areas on the webs of the crankshaft without upsetting the balance thereof; the step (c) of chucking said shaft by said areas and rough machining it; the step (d) of unclamping the shaft and remachining a second set of areas; the step (e) of reclamping the shaft on the new areas and finish turning the bearings of the shaft; and the step (f) of unchucking the shaft for finally straightening it.

WILLIAM F. GROENE.
WALTER R. MEYER.